US010473944B2

(12) United States Patent
Yang et al.

(10) Patent No.: US 10,473,944 B2
(45) Date of Patent: Nov. 12, 2019

(54) DISPLAY DEVICE, GLASSES-FREE THREE-DIMENSIONAL (3D) DISPLAY SYSTEM AND VIRTUAL REALITY (VR) GLASSES

(71) Applicants: BOE Technology Group Co., Ltd., Beijing (CN); Beijing BOE Optoelectronics Technology Co., Ltd., Beijing (CN)

(72) Inventors: Ming Yang, Beijing (CN); Qian Wang, Beijing (CN); Xiaochuan Chen, Beijing (CN); Wenqing Zhao, Beijing (CN); Pengcheng Lu, Beijing (CN); Rui Xu, Beijing (CN); Lei Wang, Beijing (CN); Xiaochen Niu, Beijing (CN); Jian Gao, Beijing (CN); Haisheng Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/539,715

(22) PCT Filed: Oct. 24, 2016

(86) PCT No.: PCT/CN2016/102993
§ 371 (c)(1),
(2) Date: Jun. 26, 2017

(87) PCT Pub. No.: WO2017/173810
PCT Pub. Date: Oct. 12, 2017

(65) Prior Publication Data
US 2018/0088344 A1    Mar. 29, 2018

(30) Foreign Application Priority Data
Apr. 8, 2016   (CN) .......................... 2016 1 0219012

(51) Int. Cl.
*G02F 1/1343*    (2006.01)
*G02B 27/01*    (2006.01)
(Continued)

(52) U.S. Cl.
CPC ........... *G02B 27/22* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS 7,586,559 B2 *   9/2009   Minoura ............... G02F 1/1335
                                                          349/167
2011/0227487 A1*   9/2011   Nichol ................. G02B 6/0018
                                                          315/158
(Continued)

FOREIGN PATENT DOCUMENTS

CN         101055372 A      10/2007
CN         101685210 A       3/2010
(Continued)

OTHER PUBLICATIONS

Kim et al.; Machine Translation of KR10-2008-0108831A cited in IDS Nov. 20, 2017.*
(Continued)

*Primary Examiner* — Peter Hoang
(74) *Attorney, Agent, or Firm* — Banner & Witcoff, Ltd.

(57) ABSTRACT

A display device, a glasses-free three-dimensional display system and virtual reality (VR) glasses are disclosed. The display device includes a backlight; a polarizer disposed on a light-emitting side of the backlight and a plurality of liquid crystal displays (LCDs) stacked on a light-emitting side of the polarizer. Each LCD includes a plurality of light adjust-
(Continued)

ing units; the light adjusting units of the plurality of LCDs are staggered from each other; and the light adjusting unit is configured to allow light emitted by the backlight to be refracted and emitted to a target position or be totally reflected.

19 Claims, 5 Drawing Sheets

(51) Int. Cl.
*H04N 13/344* (2018.01)
*G02B 27/22* (2018.01)
*G02F 1/1335* (2006.01)
*G02B 27/26* (2006.01)
*G02F 1/1347* (2006.01)
*G02F 1/1337* (2006.01)

(52) U.S. Cl.
CPC ........... *G02B 27/26* (2013.01); *G02F 1/1335* (2013.01); *G02F 1/1343* (2013.01); *G02F 1/13471* (2013.01); *G02F 1/133514* (2013.01); *G02F 1/133528* (2013.01); *G02F 1/133602* (2013.01); *H04N 13/344* (2018.05); *G02B 2027/0178* (2013.01); *G02F 1/133707* (2013.01); *H04N 2213/001* (2013.01)

(56) References Cited

U.S. PATENT DOCUMENTS

| | | | | |
|---|---|---|---|---|
| 2012/0206678 A1* | 8/2012 | Kim | ................. | G02F 1/133516 349/106 |
| 2013/0009883 A1* | 1/2013 | Chen | ....................... | G02F 1/167 345/173 |
| 2013/0155208 A1 | 6/2013 | Ichihashi et al. | | |
| 2014/0028933 A1* | 1/2014 | Chen | ..................... | G02B 27/26 349/15 |
| 2016/0026253 A1* | 1/2016 | Bradski | ................ | G02B 27/225 345/8 |

FOREIGN PATENT DOCUMENTS

| | | |
|---|---|---|
| CN | 201765418 U | 3/2011 |
| CN | 102749717 A | 10/2012 |
| CN | 103149767 A | 6/2013 |
| CN | 103176308 A | 6/2013 |
| CN | 103592772 A | 2/2014 |
| CN | 104020624 A | 9/2014 |
| CN | 104020625 A | 9/2014 |
| CN | 104199193 A | 12/2014 |
| CN | 104536220 A | 4/2015 |
| CN | 104865744 A | 8/2015 |
| CN | 105629491 A | 6/2016 |
| JP | H10-123984 A | 5/1998 |
| JP | 2003-91006 A | 3/2003 |
| KR | 10-2008-0108831 A | 12/2008 |

OTHER PUBLICATIONS

Jan. 23, 2017—International Search Report and Written Opinion Appn PCT/CN2016/102993 with Eng Tran.
Aug. 18, 2017—(CN) First Office Action 201610219012.2 with Eng Tran.
Apr. 25, 2018—(CN) Second Office Action Appn 201610219012.2 with English Translation.

* cited by examiner

DISPLAY DEVICE, GLASSES-FREE THREE-DIMENSIONAL (3D) DISPLAY SYSTEM AND VIRTUAL REALITY (VR) GLASSES

The application is a U.S. National Phase Entry of International Application No. PCT/CN2016/102993 filed on Oct. 24, 2016, designating the United States of America and claiming priority to Chinese Patent Application No. 201610219012.2, filed Apr. 8, 2016. The present application claims priority to and the benefit of the above-identified applications and the above-identified applications are incorporated by reference herein in their entirety.

TECHNICAL FIELD

Embodiments of the present disclosure relate to a display device, a glasses-free three-dimensional (3D) display system, and virtual reality (VR) glasses.

BACKGROUND

The propagation direction of light emitted from a display device can be accurately controlled so that more light can be irradiated to the target position (e.g., a human eye). Therefore, the light utilization of the display device can be effectively improved, and hence the display effect of the display device can be improved.

SUMMARY

Embodiments of the present disclosure provide a display device, a glasses-free 3D display system and VR glasses, which can improve the light utilization of the display device.

An embodiment of the present disclosure provides a display device, comprising: a backlight; a polarizer disposed on a light-emitting side of the backlight; and a plurality of liquid crystal displays (LCDs) stacked on a light-emitting side of the polarizer. Each LCD includes a plurality of light adjusting units; the light adjusting units of the plurality of LCDs are staggered from each other; and the light adjusting unit is configured to allow light emitted by the backlight to be refracted and emitted to a target position or be totally reflected.

An embodiment of the present disclosure provides a glasses-free 3D display system, comprising the above display device.

For example, the display device includes a plurality of pixels arranged in an array; each pixel includes a plurality of sub-pixels; each sub-pixel corresponds to one or more light adjusting units; the target position includes a left-eye position and a right-eye position; odd columns of sub-pixels display a left-eye image; even columns of sub-pixels display a right-eye image; upon odd columns of light adjusting units adjusting light, light emitted by the backlight can be refracted and emitted to the left eye or be totally reflected; and upon even columns of light adjusting units adjusting light, the light emitted by the backlight can be refracted and emitted to the right eye or be totally reflected.

An embodiment of the present disclosure further provides Virtual reality (VR) glasses, comprising a left-eye glass and a right-eye glass, wherein both the left-eye glass and the right-eye glass each include the above display device.

For example, the display device of the left-eye glass displays a left-eye image; upon the light adjusting units in the display device adjusting light, light emitted by the backlight can be refracted and emitted to the left eye or be totally reflected; and the display device of the right-eye glass displays a right-eye image; and upon the light adjusting units in the display device adjusting light, the light emitted by the backlight can be refracted and emitted to the right eye or be totally reflected.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

1—backlight; 2—polarizer; 3—LCD; 31—light adjusting unit; 301—first substrate; 302—second substrate; 303—liquid crystal molecule layer; 304—strip electrode; 305—plate electrode; 4—optical color conversion layer.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
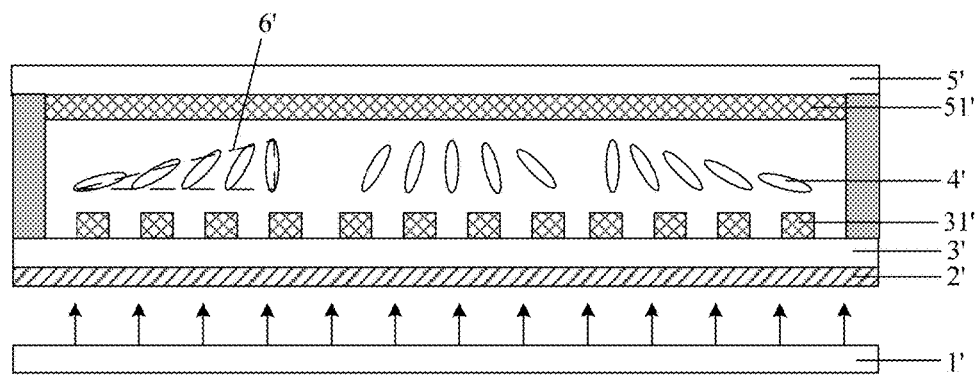
FIG. 1 is a schematic diagram of a display device.

Illustratively, as illustrated in FIG. 1, the display device can accurately control the propagation direction of light emitted by the display device. The display device comprises a backlight 1', a polarizer 2', a first substrate 3', a liquid crystal molecule layer 4' and a second substrate 5' which are sequentially stacked. A plurality of strip electrodes 31' (the strip electrodes have slits) are disposed on the first substrate 3'; a plate electrode 51' (the plate electrode does not have any slits) is disposed on the second substrate 5'; a plurality of light adjusting units 6' are formed by means of the control of the electrical fields between the strip electrodes 31' and the plate electrode 51'; and the light adjusting units 6' are equivalent to LCD prisms in function when light running through the light adjusting units is adjusted, and can achieve the objective of accurately controlling the propagation direction of light and improving the light utilization of the display device.

The inventors of the present application has found that: in the display device with the above structure, because all the light adjusting units 6' need to adjust the propagation direction of light emitted by the backlight 1' so that the light can be uniformly irradiated to the target position, that is, light emitted from the light adjusting units 6' has different refraction angles and the LCD prisms equivalent to the light adjusting units 6' have different refractive index demands, the deflection states of liquid crystal molecules corresponding to the light adjusting units 6' are also all different. Thus, the deflection states of liquid crystal molecules between two adjacent light adjusting units 6' can be disordered, and hence the propagation direction of light irradiated to this part of liquid crystal molecules can be disordered. Therefore, the light cannot be irradiated to the target position, so that the light utilization of the display device can be still low.

Figure 2:
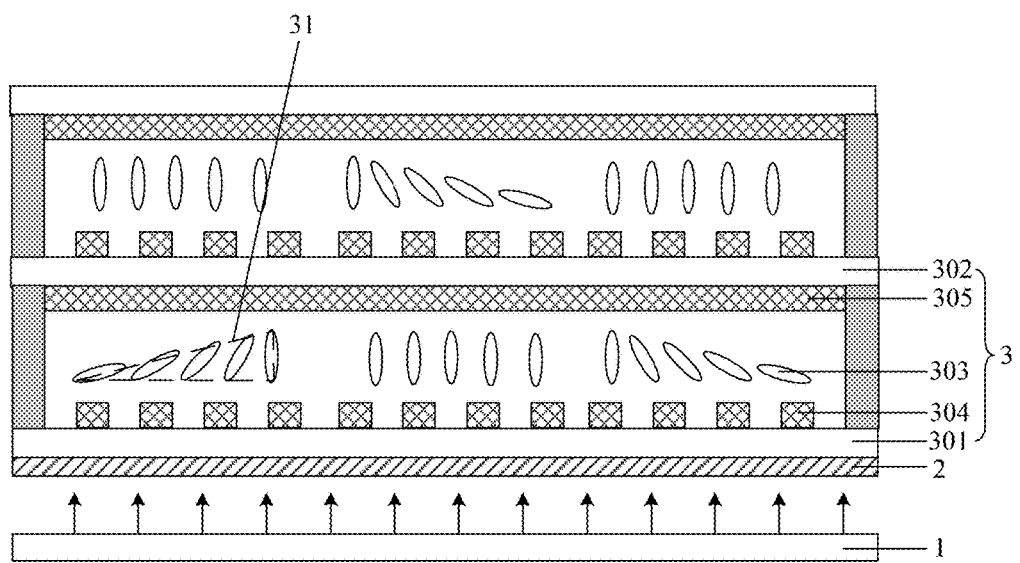
FIG. 2 is a first schematic diagram of the display device provided by an embodiment of the present disclosure.

The embodiment of the present disclosure provides a display device. As illustrated in FIG. 2, the display device comprises a backlight 1 and a polarizer 2 disposed on a light-emitting side of the backlight 1. The display device further comprises a plurality of LCDs 3 stacked on the light-emitting side of the polarizer 2. Each LCD 3 includes a plurality of light adjusting units 31; the light adjusting units 31 of the plurality of LCDs 3 are staggered from each other; and the light adjusting units 31 adjust light and are configured to allow light emitted by the backlight 1 to be refracted and emitted to the target position or be totally reflected (equivalent to LCD prisms). The target position may be human eyes, a camera, etc.

Figure 3:
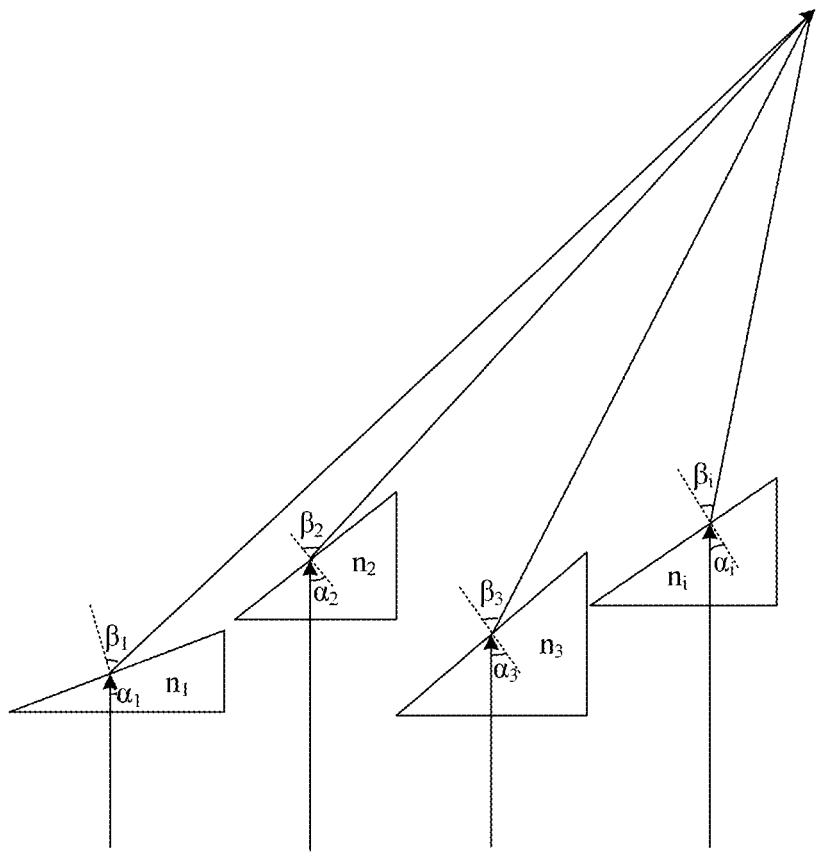
FIG. 3 is a first schematic diagram illustrating the light adjustment of a plurality of light adjusting units in an embodiment of the present disclosure.

As illustrated in FIG. 3, the distances from the light adjusting units 31 to the target position are different from each other, so light emitted from the light adjusting units 31 have different refraction angles in order to achieve the objective that the light emitted from the light adjusting units 31 can be all irradiated to the target position. More specifically, if the distance between the light adjusting unit 31 and the target position is longer, the refraction angle of the light emitted from the light adjusting unit 31 is larger.

It should be noted that the description that "the light adjusting units 31 of the plurality of LCDs 3 are staggered from each other" may involve a plurality of cases. For instance, as illustrated in FIG. 2, the plurality of light adjusting units 31 of each LCD are not adjacent to each other, and the light adjusting units 31 of different LCDs 3 are staggered from each other; or part of light adjusting units 31 of each LCD 3 are adjacent to each other, and the light adjusting units 31 of different LCDs are staggered from each other; or the light adjusting units 31 of each LCD 3 are all adjacent to each other, and the light adjusting units of different LCDs 3 are staggered from each other. In the case where all the plurality of light adjusting units 31 of each LCD 3 are not adjacent to each other and the light adjusting units 31 of different LCDs 3 are staggered from each other, the phenomenon of disordered deflection state of the liquid crystal molecules in the LCDs 3 can be completely eliminated, so that the phenomenon of disordered propagation directions of the light emitted from the display device can be completely eliminated. Thus, more light can be irradiated to the target position, so that the light utilization of the display device can be effectively improved. Therefore, in the embodiment of the present disclosure, preferably, all the plurality of light adjusting units 31 of each LCD 3 are not adjacent to each other and the light adjusting units 31 of different LCDs 3 are staggered from each other.

When the light adjusting units 31 in the embodiment of the present disclosure adjust light, the shape of the longitudinal section of the equivalent LCD prism may be triangular, quadrilateral, or the like. For instance, if the shape of the section of the LCD prism is a right-angled triangle, light emitted by the backlight 1 is all perpendicularly irradiated to a right-angled surface of the LCD prism, so the light utilization of the light adjusting units 31 is allowed to be the highest.

Detailed description will be given below to the working state of the light adjusting units 31 in an embodiment of the present disclosure for more clear understanding.

In the embodiment of the present disclosure, the light adjusting units 31 may have the following three working states.

First state: when the light emitted by the backlight 1 is irradiated to the light adjusting units 31, the propagation direction of the light does not change, namely the light adjusting units 31 do not adjust the propagation direction of the light.

Figure 4:
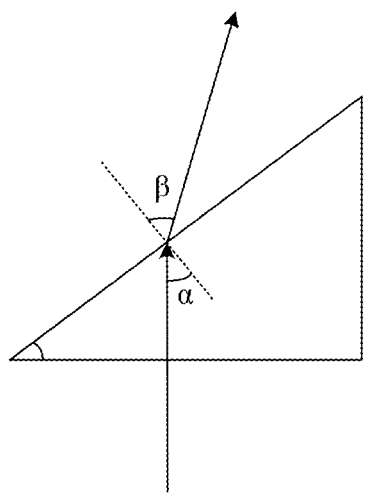
FIG. 4 is a first schematic diagram illustrating the light adjustment of a light adjusting unit in an embodiment of the present disclosure.

Second state: as illustrated in FIG. 4, when the light emitted by the backlight 1 is irradiated to the light adjusting unit 31, the incidence angle $\alpha$ of the light is less than the critical angle of the LCD prism equivalent to the light adjusting unit 31; the light is refracted in the light adjusting unit 31 and emitted to the target position at the refraction angle $\beta$; and at this point, the relationship between the refractive index n of the LCD prism equivalent to the light adjusting unit 31 and the incidence angle $\alpha$ and the refraction angle $\beta$ satisfies the following formula: $n*\sin \alpha = \sin \beta$, namely the light adjusting unit 31 is in the turn-on mode.

Figure 5:
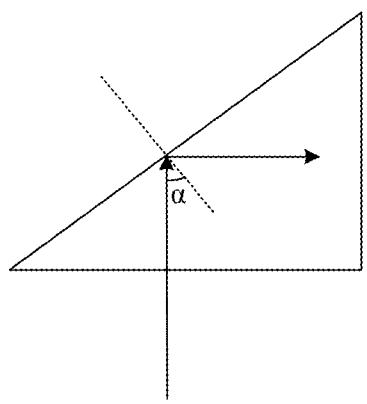
FIG. 5 is a second schematic diagram illustrating the light adjustment of the light adjusting unit in an embodiment of the present disclosure.

Third state: as illustrated in FIG. 5, when the light emitted by the backlight 1 is irradiated to the light adjusting unit 31, the incidence angle $\alpha$ is greater than or equal to the critical angle of the LCD prism equivalent to the light adjusting unit 31; and the light is totally reflected in the light adjusting unit 31 and cannot be emitted from the light adjusting unit 31, namely the light adjusting unit 31 is in the turn-off mode. The critical angle of the LCD prism equivalent to the light adjusting unit 31 may be collectively determined by the factors such as the refractive index of the LCD prism and the wavelength of light incident into the LCD prism. No limitation will be given here.

In addition, the display device provided by an embodiment of the present disclosure comprises a plurality of pixels arranged in an array; each pixel includes a plurality of sub-pixels (e.g., RGB sub-pixels); each sub-pixel corresponds to one light adjusting unit 31; or each sub-pixel corresponds to a plurality of light adjusting units 31.

In the case where each sub-pixel corresponds to a plurality of light adjusting units 31, each sub-pixel can display more gray scales, so the display device has better display effect. As can be seen from the above, each light adjusting unit 31 has three working states, so the gray scale displayed by the sub-pixels can be adjusted by adjusting the working state of the light adjusting units corresponding to each sub-pixel. In addition, the display device provided by an embodiment of the present disclosure can achieve normal display by only comprising one polarizer 2 disposed on a light-emitting side of the backlight 1 but not comprising any other polarizers, so the display device has a simple structure and low cost.

Taking the case of the sub-pixel corresponding to the plurality of light adjusting units 31 as an example, when all the light adjusting units 31 corresponding to the sub-pixel are in the turn-on mode, light irradiated to the sub-pixel can all be irradiated to the target position, so the sub-pixel is at the highest grayscale. When all the light adjusting units 31 corresponding to the sub-pixel are in the turn-off mode, the light irradiated to the sub-pixel cannot be irradiated to the target position, so the sub-pixel is at the lowest grayscale. When part of light adjusting units 31 corresponding to the sub-pixel are in the turn-off mode and the other part of light adjusting units 31 are in the turn-on mode, part of the light irradiated to the sub-pixel can be irradiated to the target position, so the sub-pixel is at an intermediate grayscale. The sub-pixel can be at different intermediate grayscales by adjusting the number of the part of light adjusting units 31 and the other part of light adjusting units 31.

Figure 6:
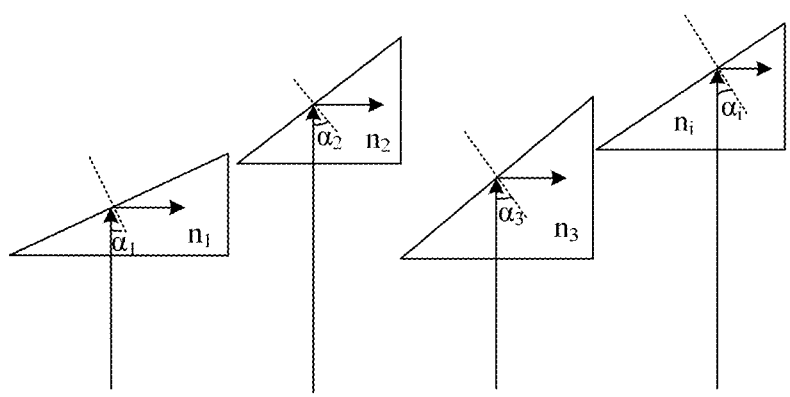
FIG. 6 is a second schematic diagram illustrating the light adjustment of a plurality of light adjusting units in an embodiment of the present disclosure.
Figure 7:
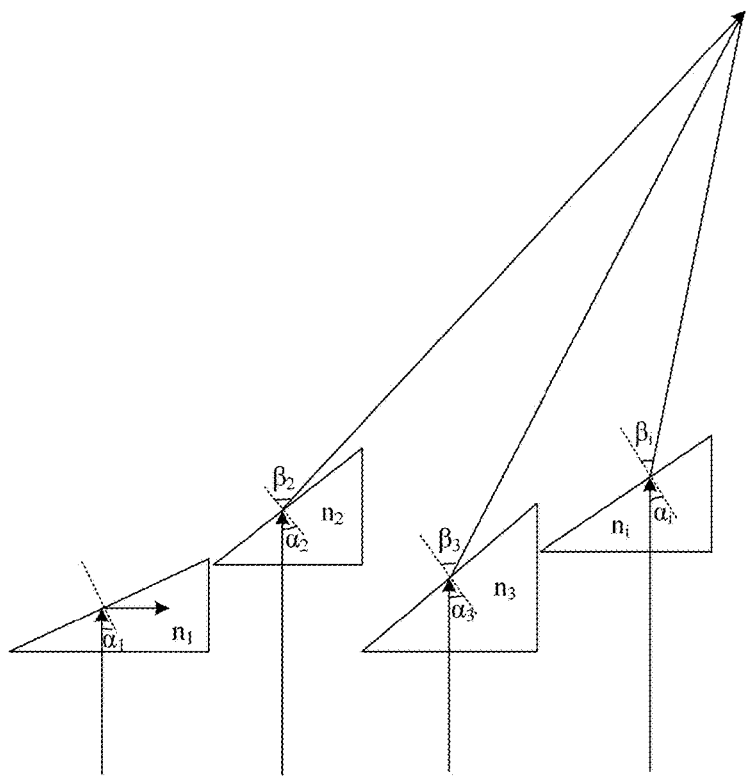
FIG. 7 is a third schematic diagram illustrating the light adjustment of the plurality of light adjusting units in an embodiment of the present disclosure.

Illustratively, as illustrated in FIGS. 3, 6 and 7, one sub-pixel corresponds to three light adjusting units 31; the refractive indexes of the three light adjusting units 31 are respectively $n_1$, $n_2$ and $n_3$; and the incidence angles of light irradiated to the three light adjusting units 31 are respectively $\alpha_1$, $\alpha_2$ and $\alpha_3$.

As illustrated in FIG. 3, if $\alpha_1$, $\alpha_2$ and $\alpha_3$ are all less than the critical angle of the LCD prisms equivalent to the light adjusting units 31, the light irradiated to the three light adjusting units 31 is respectively irradiated to the target position at the refraction angles $\beta_1$, $\beta_2$ and $\beta_3$. At this point, the three light adjusting units 31 are all in the turn-on mode, and the sub-pixel has the maximum brightness, namely at the highest grayscale.

As illustrated in FIG. 6, if $\alpha_1$, $\alpha_2$ and $\alpha_3$ are all equal to or greater than the critical angle of the LCD prisms respectively equivalent to the three light adjusting units 31, the light irradiated to the three light adjusting units 31 is all totally reflected and cannot be irradiated to the target position. At this point, the three light adjusting units 31 are all in the turn-off mode, so the sub-pixel has the minimum brightness, namely at the lowest grayscale.

If $\alpha_1$, $\alpha_2$ and $\alpha_3$ and the critical angle of the LCD prisms respectively equivalent to the three light adjusting units 31 satisfy other relationships, for instance, as illustrated in FIG. 7, $\alpha_1$ is equal to or greater than the critical angle of the LCD prism equivalent to the light adjusting unit 31; both $\alpha_2$ and $\alpha_3$ are less than the critical angles of the LCD prisms equivalent to the light adjusting units 31 corresponding to $\alpha_2$ and $\alpha_3$; the light adjusting unit 31 corresponding to $\alpha_1$ is in the turn-on mode; the other two light adjusting units 31 are in the turn-off mode; and the sub-pixel has intermediate brightness, namely at an intermediate grayscale. The sub-pixel may correspond to another intermediate brightness, namely at another intermediate grayscale, by allowing two of the three light adjusting units 31 to be in the turn-on mode and the other one to be in the turn-off mode.

Detailed description will be given below to the number and the specific structure of the LCDs in the display device with reference to the examples of the embodiments of the present disclosure.

Preferably, as illustrated in FIG. 2, the display device provided by one embodiment of the present disclosure comprises two LCDs 3, namely a first LCD and a second LCD. Light adjusting units of the first LCD are first light adjusting units, and light adjusting units of the second LCD are second light adjusting units. In the row direction and the column direction, the first light adjusting units and the second light adjusting units are alternately arranged. The display device has a simple structure and can completely avoid the phenomenon of disordered alignment of liquid crystal molecules disposed between the first light adjusting units and the second light adjusting units. In the present disclosure, the row direction refers to the row direction of pixels in the display device (e.g., the extension direction of scanning lines), and the column direction refers to the row direction of pixels in the display device (e.g., the extension direction of data lines). Unless otherwise specially stated, both the row direction and the column direction in the embodiments of the present disclosure are the above directions.

Figure 9:
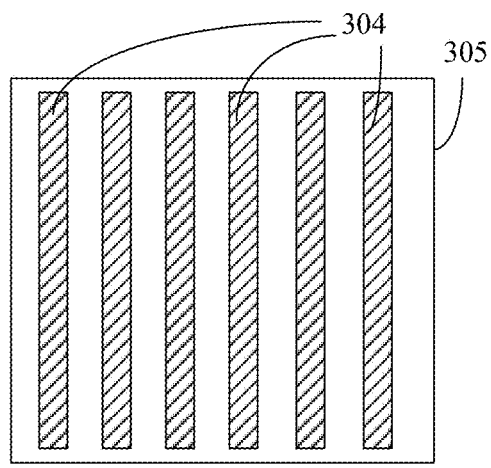
FIG. 9 is a schematic diagram illustrating the arrangement of strip electrodes and a plate electrode in an embodiment of the present disclosure.

Optionally, as illustrated in FIG. 2, each LCD 3 includes a first substrate 301 and a second substrate 302 arranged opposite to each other, and a liquid crystal molecule layer 303 disposed between the first substrate and the second substrate; a plurality of strip electrodes 304 are disposed on one surface of the first substrate 301 facing the liquid crystal molecule layer 303; the extension direction of the strip electrodes 304 is the column direction; one light adjusting unit 31 corresponds to a plurality of strip electrodes 304 in the row direction; and a plate electrode 305 is disposed on one surface of the second substrate 302 facing the liquid crystal molecule layer 303. FIG. 9 is a schematic plan view of the strip electrodes 304 and the plate electrode 305, and leads or through holes connected with the strip electrodes and the plate electrode are not shown in the drawings. In the embodiment of the present disclosure, preferably, two adjacent LCDs 3 share one substrate, so the display device has a simple structure and low cost.

The larger the number of the strip electrodes 304 corresponding to one light adjusting unit 31 in the row direction is, the more accurately the light adjusting unit can adjust light, but the higher the requirements on processes and the driving method become. The number may be selected by those skilled in the art according to actual demands. Illustratively, one light adjusting unit 31 may correspond to two to ten strip electrodes 304 in the row direction. It should be noted that the number of the strip electrodes 304 corresponding to different light adjusting units 31 may be the same and may also be different. The number may be selected by those skilled in the art according to actual demands. In addition, the voltages applied to the strip electrodes 304 may be all different; or a plurality of adjacent strip electrodes 304 are combined into one group, the same voltage is applied to one group of strip electrodes 304, and the different voltages are applied to different groups of strip electrodes 304. No limitation will be given here in the embodiment of the present disclosure, as long as the light adjusting units 31 can be equivalent to required LCD prisms.

Moreover, the strip electrodes 304 may be disposed at all the positions of the first substrate 301 of each LCD 3, and the voltage that is the same as that of the plate electrode 305 may be applied to the strip electrodes 304 between two adjacent light adjusting units 31, so that no electrical field can be formed between the strip electrodes and the plate electrode, and hence the liquid crystal molecules disposed between the strip electrodes and the plate electrode cannot be deflected and the propagation direction of light irradiated to this part of liquid crystal molecules cannot be varied. Because the strip electrodes are also disposed between two adjacent light adjusting units 31, if required, electrical fields may also be formed between the strip electrodes 304 between two adjacent light adjusting units 31 and the plate electrode 305, so that corresponding liquid crystal molecules at the positions can be deflected to adjust the propagation direction of light irradiated to the liquid crystal molecules, and hence the LCD 3 can more flexibly adjust light. Or the strip electrodes 304 are only disposed at positions, corresponding to the plurality of light adjusting units 31, on the first substrate 301 of each LCD 3; because the strip electrodes 304 are not disposed at the positions between two adjacent light adjusting units 31, light irradiated to the positions passes through less layers, so light loss is less and light utilization is high. The setting method may be selected by those skilled in the art according to actual demands. No limitation will be given here.

Figure 8:
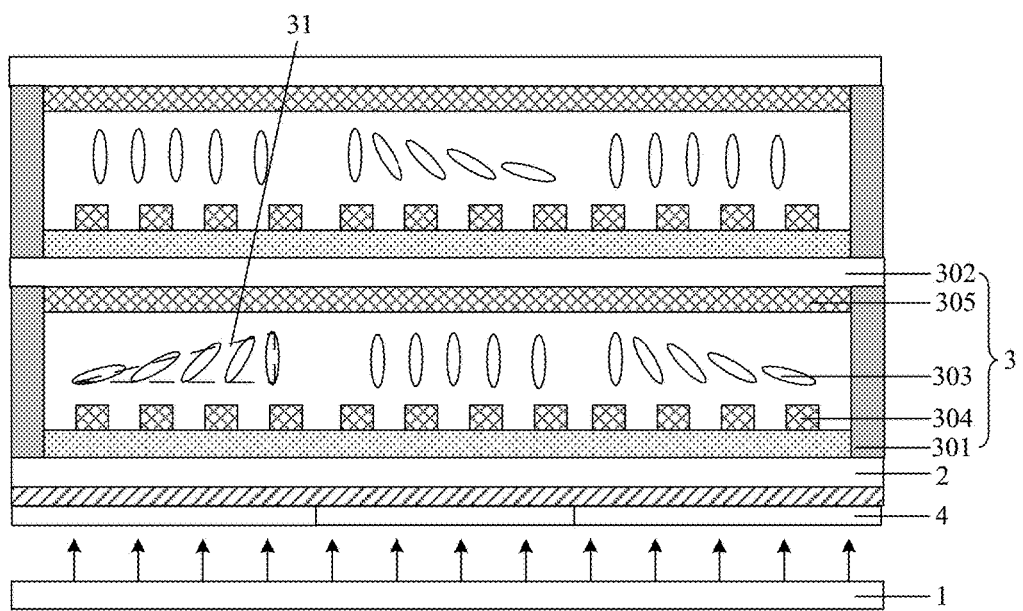
FIG. 8 is a second schematic diagram of a display device provided by an embodiment of the present disclosure.

In addition, as illustrated in FIG. 8, the display device may further comprise a optical color conversion layer 4 disposed on the light-emitting side of the backlight 1. The optical color conversion layer 4 includes a plurality of areas, and different areas are configured to convert light irradiated to the areas into light of different colors, so that the display device can achieve color display. One example of the optical color conversion layer 4 is, for instance, color filters made from colorful resin. Illustratively, all the light emitted by the backlight 1 is converted into light of at least three colors after running through the optical color conversion layer 4, generally converted into light of Three colors RGB, of course, may also be converted into light with colors such as yellow (Y) and white (W). No limitation will be given here in the embodiment of the present disclosure.

The optical color conversion layer 4 is disposed on an incident side of all the LCDs 3. For instance, the optical color conversion layer 4 may be disposed between the backlight 1 and the polarizer 2 or disposed between the polarizer 2 and an LCD 3 that is closest to the polarizer 2; alternatively, the optical color conversion layer 4 is disposed on a light-emitting side of at least one LCD 3, for instance, disposed between any two LCDs 3, or disposed on one side of an LCD 3 that is farthest from the backlight 1, which side is away from the backlight 1. The inventors notice that if the optical color conversion layer 4 is disposed on the light-emitting side of at least one LCD 3, the light irradiated to at least one light adjusting unit 31 may be such light as having large wavelength range. Thus, the refractive index of light in the LCD prisms equivalent to the light adjusting units 31 can be inconsistent; the light has different refraction angles when emitted from the light adjusting units 31; the propagation direction of the emitted light is inconsistent; furthermore, light, which should have been absorbed by one area of the optical color conversion layer 4, can be emitted from other areas of the optical color conversion layer 4; and hence the display effect of the display device can be affected. Therefore, in an embodiment of the present disclosure, preferably, as illustrated in FIG. 8, the optical color conversion layer 4 is disposed on the light incident side of all the LCDs 3, e.g., disposed between the backlight 1 and the polarizer 2 or disposed between the polarizer 2 and the LCD 3 that is closest to the polarizer 2. At this point, light emitted by the backlight 1 runs through the optical color conversion layer 4 at first, and then arrives at the light adjusting units 31 in the LCDs 3, so that the above problem can be avoided, and hence the display effect of the display device can be guaranteed.

Optionally, the backlight 1 in an embodiment of the present disclosure may be a white light source or a blue light source, and may be an inorganic or organic light-emitting diode (LED). When the backlight 1 becomes different, the optical color conversion layer 4 is also correspondingly adjusted. Illustratively, when the backlight 1 is a white light source, the optical color conversion layer 4 is color filters, and the CF includes red areas, green areas and blue areas, so as to convert light emitted by the backlight 1 into light of three colors RGB. When the backlight 1 is a blue light source, the optical color conversion layer 4 includes first areas, second areas and third areas, in which the first areas are transparent (e.g., each is provided with a transparent layer); the second areas are provided with quantum dots for emitting red light; and the third areas are provided with quantum dots for emitting green light, so that the light emitted by the backlight 1 can be converted into light of three colors RGB. The materials of quantum dots can also be replaced by fluorescent materials.

Of course, the display device provided by an embodiment of the present disclosure further comprises a driving circuit (e.g., an integrated circuit (IC)) for applying voltages to the strip electrodes 304 and the plate electrode 305. The driving circuit is connected with the strip electrodes 304 and the plate electrode 305 through a flexible circuit board. In addition, each LCD 3 also includes sealant for sealing the liquid crystal molecule layer 303 between the first substrate 301 and the second substrate 302. The specific structure and the setting method of the IC, the flexible circuit board and the sealant can be implemented by those skilled in the art with reference to the prior art. No further description will be given here.

An embodiment of the present disclosure provides a display device with the above structure. The display device comprises at least two LCDs that stacked on a light-emitting side of a polarizer. Each LCD includes a plurality of light adjusting units, and the light adjusting units of the LCDs are staggered from each other, so that only part of light adjusting units in the plurality of light adjusting units of each LCD are adjacent to each other, or all the light adjusting units are not adjacent to each other. Therefore, the display device can effectively reduce and even completely eliminate the phenomenon of disordered deflection state of liquid crystal molecules in the LCDs, and hence can effectively reduce and even completely eliminate the phenomenon of disordered propagation directions of light emitted from the display device, so that more light can be irradiated to the target position, and hence the light utilization of the display device can be effectively improved.

In addition, an embodiment of the present disclosure further provides a glasses-free 3D display system. The glasses-free 3D display system comprises anyone of the foregoing display devices. The display device includes a plurality of pixels arranged in an array; each pixel includes a plurality of sub-pixels; each sub-pixel corresponds to one or more light adjusting units; and the target position includes a left-eye position and a right-eye position. For instance, odd columns of sub-pixels display a left-eye image, and even columns of sub-pixels display a right-eye image. When odd columns of light adjusting units adjust light, light emitted by the backlight can be refracted and emitted to the left eye or be totally reflected. When even columns of light adjusting units adjust light, the light emitted by the backlight can be refracted and emitted to the right eye or be totally reflected. Therefore, glasses-free 3D display can be achieved by adjusting the working state of the light adjusting units.

As the glasses-free 3D display system comprises the foregoing display device, the glasses-free 3D display system can have high light utilization while achieving glasses-free 3D display simultaneously.

In addition, an embodiment of the present disclosure further provides VR glasses. The VR glasses include a left-eye glass and a right-eye glass. Both the left-eye glass and the right-eye glass include one foregoing display device; the display device in the left-eye glass displays a left-eye image; when light adjusting units in the display device adjust light, light emitted by the backlight can be refracted and emitted to the left eye or be totally reflected; the display device in the right-eye glass displays a right-eye image; and when light adjusting units in the display device adjust light, the light emitted by the backlight can be refracted and emitted to the right eye or be totally reflected. Therefore, VR display can be achieved by adjusting the working state of the light adjusting units in the two display devices.

As the VR glasses include the foregoing device, the VR glasses can have high light utilization while achieving VR display simultaneously.

What are described above is related to the illustrative embodiments of the disclosure only and not limitative to the scope of the disclosure; the scopes of the disclosure are defined by the accompanying claims.

The application claims priority to the Chinese patent application No. 201610219012.2, filed Apr. 8, 2016, the entire disclosure of which is incorporated herein by reference as part of the present application.

What is claimed is:

1. A display device, comprising:
    a backlight;
    a polarizer disposed on a light-emitting side of the backlight; and
    a plurality of liquid crystal displays (LCDs) stacked on a light-emitting side of the polarizer, in which each LCD includes a plurality of light adjusting units; projections of the light adjusting units of different LCDs of the plurality of LCDs on a substrate of one of the plurality of LCDs are not overlapped with each other; and the light adjusting unit is configured to be switched between allowing light emitted by the backlight to be refracted and emitted to a target position and allowing light emitted from the backlight to be totally reflected in the light adjusting unit,
    wherein each of the plurality of light adjusting units comprises a liquid crystal molecule layer.

2. The display device according to claim 1, wherein the display device comprises two LCDs; the two LCDs include a first LCD and a second LCD;
    light adjusting units of the first LCD include first light adjusting units;
    light adjusting units of the second LCD include second light adjusting units; and
    both in a row direction of the display device and a column direction of the display device, the first light adjusting units and the second light adjusting units are alternately arranged.

3. The display device according to claim 1, wherein each LCD includes a first substrate and a second substrate that are arranged opposite to each other, and the liquid crystal molecule layer disposed between the first substrate and the second substrate;
    a plurality of strip electrodes are disposed on one surface of the first substrate facing the liquid crystal molecule layer; an extension direction of the strip electrodes is a column direction; and one light adjusting unit corresponds to a plurality of strip electrodes in a row direction; and
    a plate electrode is disposed on one surface of the second substrate facing the liquid crystal molecule layer.

4. The display device according to claim 3, wherein the strip electrodes are disposed at all positions of the first substrate of each LCD.

5. The display device according to claim 3, wherein the strip electrodes are only disposed at positions, corresponding to the plurality of light adjusting units, on the first substrate of each LCD.

6. The display device according to claim 3, wherein two adjacent LCDs share one substrate.

7. The display device according to claim 1, wherein the display device comprises a plurality of pixels arranged in an array; each pixel includes a plurality of sub-pixels; and each sub-pixel corresponds to one light adjusting unit.

8. The display device according to claim 1, wherein the display device comprises a plurality of pixels arranged in an array; each pixel includes a plurality of sub-pixels; and each sub-pixel corresponds to a plurality of light adjusting units.

9. The display device according to claim 1, further comprising a optical color conversion layer disposed on the light-emitting side of the backlight,
    wherein the optical color conversion layer includes a plurality of areas; and different areas are configured to convert light irradiated to the areas into light of different colors.

10. The display device according to claim 9, wherein the optical color conversion layer is disposed on a light incident side of the LCD.

11. The display device according to claim 9, wherein the backlight is a white light source; and the optical color conversion layer comprises a color filter.

12. The display device according to claim 11, wherein the color filter includes red areas, green areas and blue areas.

13. The display device according to claim 9, wherein the backlight is a blue light source; the optical color conversion layer includes first areas, second areas and third areas; the first areas are transparent; the second areas are provided with quantum dots for emitting red light; and the third areas are provided with quantum dots for emitting green light.

14. A glasses-free 3D display system, comprising the display device according to claim 1.

15. The glasses-free 3D display system according to claim 14, wherein the display device includes a plurality of pixels arranged in an array; each pixel includes a plurality of sub-pixels; each sub-pixel corresponds to one or more light adjusting units;
    the target position includes a left-eye position and a right-eye position; odd columns of sub-pixels display a left-eye image; even columns of sub-pixels display a right-eye image; upon odd columns of light adjusting units adjusting light, light emitted by the backlight can be refracted and emitted to the left eye or be totally reflected; and upon even columns of light adjusting units adjusting light, the light emitted by the backlight can be refracted and emitted to the right eye or be totally reflected.

16. Virtual reality (VR) glasses, comprising a left-eye glass and a right-eye glass, wherein both the left-eye glass and the right-eye glass each include the display device according to claim 1.

17. The VR glasses according to claim 16, wherein the display device of the left-eye glass displays a left-eye image; upon the light adjusting units in the display device adjusting light, light emitted by the backlight can be refracted and emitted to the left eye or be totally reflected; and the display device of the right-eye glass displays a right-eye image; and upon the light adjusting units in the display device adjusting light, the light emitted by the backlight can be refracted and emitted to the right eye or be totally reflected.

18. The display device according to claim 2, wherein the display device comprises a plurality of pixels arranged in an array; each pixel includes a plurality of sub-pixels; and each sub-pixel corresponds to a plurality of light adjusting units.

19. The display device according to claim 3, wherein the display device comprises a plurality of pixels arranged in an array; each pixel includes a plurality of sub-pixels; and each sub-pixel corresponds to a plurality of light adjusting units.

* * * * *